(12) United States Patent
Wortge et al.

(10) Patent No.: US 9,212,896 B2
(45) Date of Patent: Dec. 15, 2015

(54) OPTICAL INTERFEROMETER AND VIBROMETER COMPRISING SUCH AN OPTICAL INTERFEROMETER

(71) Applicant: Polytec GmbH, Waldbronn (DE)

(72) Inventors: Michael Wortge, Heidelberg (DE); Christian Rembe, Walkbronn (DE); Alexander Drabenstedt, Ettlingen (DE); Tobias Braun, Karlsbad (DE)

(73) Assignee: POLYTEC GMBH, Waldbronn (DE)

( * ) Notice: Subject to any disclaimer, the term of this patent is extended or adjusted under 35 U.S.C. 154(b) by 0 days.

(21) Appl. No.: 14/287,300

(22) Filed: May 27, 2014

(65) Prior Publication Data

US 2014/0347670 A1 Nov. 27, 2014

(30) Foreign Application Priority Data

May 27, 2013 (DE) .................. 10 2013 209 833

(51) Int. Cl.
*G01B 9/02* (2006.01)
*G01H 9/00* (2006.01)

(52) U.S. Cl.
CPC ........ *G01B 9/02023* (2013.01); *G01B 9/02002* (2013.01); *G01B 9/02029* (2013.01); *G01B 9/02051* (2013.01); *G01H 9/00* (2013.01)

(58) Field of Classification Search
CPC ......... G01B 9/02; G01J 9/04; G03F 7/70775; G03F 7/70716; G01D 5/266
USPC ....................................... 356/487
See application file for complete search history.

(56) References Cited

U.S. PATENT DOCUMENTS

| | | | |
|---|---|---|---|
| 4,913,547 A * | 4/1990 | Moran ......................... | 356/489 |
| 2007/0189778 A1* | 8/2007 | Burns et al. .................. | 398/183 |
| 2007/0236700 A1* | 10/2007 | Yun et al. ..................... | 356/491 |
| 2007/0279637 A1* | 12/2007 | Hill .............................. | 356/486 |
| 2008/0285049 A1* | 11/2008 | Rembe et al. ................ | 356/497 |
| 2011/0299090 A1* | 12/2011 | Ueki ............................ | 356/491 |
| 2012/0154780 A1* | 6/2012 | Demarest ..................... | 355/72 |

(Continued)

FOREIGN PATENT DOCUMENTS

| | | |
|---|---|---|
| DE | 102012211549 | 7/2013 |
| EP | 0448751 | 10/1991 |
| EP | 0636858 | 2/1995 |

OTHER PUBLICATIONS

Valera, J.D. et al., "Combined Fibre Optic Laser Velocimeter and Electronic Speckle Pattern Interferometer with a Common reference Beam", Meas Sci. Technol. 4 (1993), pp. 578-582.

(Continued)

*Primary Examiner* — Tarifur Chowdhury
*Assistant Examiner* — Mohammad Rahman
(74) *Attorney, Agent, or Firm* — Volpe and Koenig, P.C.

(57) ABSTRACT

An optical interferometer including an output-beam beam input for coupling-in an output beam, and a beam splitter device for splitting the output beam into at least one first sub-beam and one second sub-beam, the interferometer being embodied as a heterodyne interferometer by virtue of at least one optical frequency shifter being arranged in the beam path of the interferometer and the interferometer including one or more optical waveguide elements, by which optical waveguides are formed, at least between the output-beam beam input, beam splitter device and frequency shifter. The frequency shifter is arranged in the beam path of the first or second sub-beam.

17 Claims, 3 Drawing Sheets

(56) References Cited

U.S. PATENT DOCUMENTS

2013/0088719 A1* 4/2013 Sugiyama et al. ............ 356/450
2014/0009750 A1 1/2014 Schussler et al.

OTHER PUBLICATIONS

Toda, H., "Optical Integrated Circuit for a Fiber Laser Doppler Velocimeter." In: Journal of Lightwave Technology, vol. 5, Nr. 7, Jul. 1987, pp. 901-905. ISSN 0733-8724.

* cited by examiner

OPTICAL INTERFEROMETER AND VIBROMETER COMPRISING SUCH AN OPTICAL INTERFEROMETER

INCORPORATION BY REFERENCE

The following documents are incorporated herein by reference as if fully set forth: German Patent Application No. DE 10 2013 209 833.2, filed May 27, 2013.

BACKGROUND

The invention relates to an optical interferometer, and to an interferometer which comprises such an optical interferometer.

An optical interferometer is used to split an output beam using a beam splitter device into at least one first and one second sub-beam; the two sub-beams are guided, at least in regions, through separate optical tracks and the two sub-beams are finally superposed again in order to form interference. Interferometers in embodiments such as e.g. the Mach-Zehnder interferometer or the Michelson interferometer are known.

Here, the invention relates to interferometers which are embodied as heterodyne interferometers. Such heterodyne interferometers comprise at least one optical frequency shifter in the beam path of the interferometer, typically in the beam path of one of the at least two sub-beams.

Such interferometers are used, in particular in metrology, for precisely determining lengths or for determining the movement or vibration of an object.

EP 0 448 751 B1 has disclosed a heterodyne interferometer with a lithium niobate crystal. The interferometer comprises a polarization-rotating converter, which shifts frequencies in the process. In this case, an output beam is split, in particular by two acousto-optic components, into two sub-beams with approximately the same intensity but different polarizations, which sub-beams are separated by a polarization splitter.

SUMMARY

The invention is based on the object of developing the already known optical interferometers, in particular in order to increase the component reproducibility and the reliability of the interferometer.

This object is achieved by an optical interferometer according to the invention. Advantageous configurations of the interferometer according to the invention are described below and in the claims, which are incorporated in this Summary section by reference for the sake of brevity.

The interferometer according to the invention comprises an output-beam beam input for coupling-in an output beam, and a beam splitter device for splitting the output beam into at least one first sub-beam and one second sub-beam. The interferometer is embodied as a heterodyne interferometer by virtue of at least one optical frequency shifter being arranged in the beam path of the interferometer. Therefore, the frequency of the first sub-beam can be shifted at least with respect to the frequency of the second sub-beam by the frequency shifter, and so the interference signal has a carrier frequency.

The interferometer comprises one or more optical waveguide elements, by which optical waveguides are formed, at least between the output-beam beam input, beam splitter device and frequency shifter.

What is essential is that the frequency shifter is arranged in the beam path of the first or second sub-beam.

Therefore, in terms of design, the interferometer according to the invention differs fundamentally from previously known interferometers, in particular from the interferometer known from EP 0 448 751 B1, by virtue of the beam splitter device being arranged in front of the frequency shifter in the beam path, proceeding from the output-beam beam input.

What emerges herefrom is the advantage of previously known designs comprising waveguide elements, in which a compact and robust configuration can be formed with only few, and in particular also with no, free-beam components, and, moreover, as a result of arranging the frequency shifter in the beam path of the first or second sub-beam, only small demands are placed on the embodiment of a beam splitter device and frequency shifter: in particular, it is not necessary for the frequency shifter and beam splitter to be embodied as optically polarizing components matched to one another.

Therefore, there is greater freedom in design compared to previously known interferometers in terms of design and parameterization of the beam splitter device and frequency shifter, while the advantages of using waveguide elements are maintained. Moreover, studies by the applicant have shown that the embodiment of polarizing the beam splitter device and frequency shifter, matched to one another, in accordance with the aforementioned prior art places very high demands on the production of such optical components, and so it is only possible to achieve low reproducibility and thus there is a high rejection rate and therefore there are high costs in the production process. These disadvantages are avoided by the interferometer according to the invention.

The invention is based on the discovery that non-shifted frequency parts always remain in an acousto-optic frequency shifter; there are components in the opposite shift direction and higher harmonic components. These extraneous light components have a very negative influence on the signal properties of the interferometer. It is the goal of the invention to minimize these disturbance components by virtue of the light of an interferometer arm being obtained before the frequency shifter using an additional beam splitter, in particular an unpolarized beam splitter. These beam splitters, particularly advantageously in an integrated $LiNbO_3$ optical unit, can be produced much more reliably than polarizing beam splitters. Therefore, very low noise and very low disturbance light is available for an interferometer arm. Extraneous light components can only be created in the arm with the frequency shifter. Moreover, extraneous light with the wrong polarization can be minimized after the frequency shifter by a polarization filter. In the solution described in EP 0 448 751 B1, these components are unavoidably used in the reference light, while the solution described here allows a reduction by polarization filtering. The polarization splitter in the design from EP 0 448 751 B1 also has the object of being able to set a distribution of the beam power in both paths. This invention here is based on the discovery that this split can already take place before the frequency shifter by fixed or adjustable, in particular electronically adjustable splitter conditions in a non-polarizing waveguide beam splitter. Therefore, the arrangement known from free-beam optics, comprising a polarization beam splitter, can now be transferred to waveguide optics, also with the aid of a non-polarizing waveguide beam splitter.

The optical beam paths, at least between the output-beam beam input, beam splitter device and frequency shifter, are preferably only embodied as waveguides with, or, in particular, preferably without, interposition of further optical components. This achieves a robust design, and intensity losses, which occur when coupling and decoupling optical free beams into and out of waveguide elements, are avoided. In particular, it is therefore advantageous for the interferometer according to the invention, at least between the output-beam beam input, beam splitter device and frequency shifter, to have no optical free beam in a preferred embodiment, i.e. no beam path outside of a waveguide, in particular no free beam as a beam path in the surrounding atmosphere.

The waveguide element of the interferometer according to the invention is preferably embodied as a planar waveguide and/or optical fiber. In a particularly preferred manner, all waveguide elements of the interferometer according to the invention are preferably embodied as planar waveguides and/or optical fibers.

It lies within the scope of the invention to embody the beam paths of the interferometer in part by planar waveguides and in part by optical fibers. A particularly robust design is obtained by virtue of all optical beam paths, at least between the output-beam beam input, beam splitter device and frequency shifter, being embodied by planar waveguides only. If optical fibers are used, use can be made, in particular, of glass fibers known per se.

In particular, the use of fibers allows the optical interferometer to be connected to further components, for example the light source or a measurement optical unit, by commercially available connectors for optical fibers, in particular by FC/APC connectors.

In a further preferred embodiment of the interferometer according to the invention, the beam splitter device has a non-polarizing embodiment. Studies by the applicant have shown that compared to interferometers, known from the prior art, embodied by waveguides, this suppresses disturbance frequencies, as described above.

In a further preferred embodiment, the frequency shifter is embodied as a birefringent waveguide. As a result of this, firstly, it is possible to connect the frequency shifter directly to the optical waveguide elements of the interferometer, and so intensity losses are avoided. Moreover, frequency shifters known from the prior art, such as e.g. Bragg cells, exhibit disadvantages, in particular due to the temperature dependence thereof, which disadvantages are avoided by frequency shifters embodied as birefringent waveguides.

Therefore, the frequency shifter is preferably embodied as an acousto-optic frequency shifter.

It is particularly advantageous to embody the frequency shifter as a waveguide which can be influenced piezoelectrically. This allows simple actuation of the frequency shifter by an appropriately embodied electronic control unit in a manner known per se. Therefore, the frequency shifter is advantageously embodied in such a way that an acoustic surface wave is generated with the aid of an electro-acoustic transducer and then interacts in a selected region of the waveguide with the light in such a way that part of the light is converted with a frequency shift into the other polarization direction. In particular, it is advantageous to embody the frequency shifter as a lithium niobate frequency shifter, preferably as an $LiNbO_3$ frequency shifter, as is known from e.g. EP 0 448 751 B1.

By embodying the frequency shifter as a birefringent waveguide, a polarization is converted in a frequency-shifted manner into the second polarization direction by the frequency shifter. To this end, the impulse and energy conditions for the frequency shift are set precisely, preferably with the aid of temperature (influences a wavelength-dependent refractive index), wavelength and/or shift frequency.

Therefore, the interferometer preferably comprises at least one polarization filter which is arranged following the frequency shifter in the sub-beam in which the frequency shifter is arranged, and so the frequency shifter is arranged between the polarization filter and beam splitter device. The polarization filter is embodied interacting with the frequency shifter, and so the polarization filter merely passes light having the polarization of the light frequency shifted by the frequency shifter. As a result of this, the frequency-shifted light beam is "cleaned" by the polarization filter by virtue of possible further beam components having a different polarization being absorbed in the polarization filter.

In a further advantageous embodiment, the optical interferometer has at least one additional frequency shifter. The frequency shifter is arranged in the beam path of one sub-beam; the additional frequency shifter is arranged in the beam path of the other one of the two sub-beams. The additional frequency shifter is embodied in such a way that it causes a frequency change counter to the frequency change of the frequency shifter. Therefore, the additional frequency shifter generates an increased frequency difference between the first and second sub-beam in this advantageous embodiment. Furthermore, the use of frequency shifter and additional frequency shifter compared to the use of merely one frequency shifter with a correspondingly large influence on the frequency is advantageous in that a smaller carrier frequency of the interference signal is formed.

In a further advantageous embodiment of the interferometer according to the invention, the beam splitter is embodied for splitting at least two sub-beams with different intensities. This preferable embodiment is based on the discovery by the applicant that it is advantageous for typical application and, in particular, when integrating the interferometer according to the invention into a vibrometer, as described below, if one sub-beam has a higher intensity. The first sub-beam preferably has an intensity greater than or equal to 60%, preferably greater than or equal to 70%, more preferably greater than or equal to 80%, in particular approximately 85%, of the overall intensity of the two sub-beams. Therefore, in particular, a division ratio of the first sub-beam to the second sub-beam in the ratio of 60:40 to 90:10, preferably 70:30 to 85:15, is advantageous.

The beam splitter is advantageously embodied to generate an optionally pre-determinable intensity ratio, in particular in accordance with the intensity ratios described above as being advantageous. As a result of this, the intensity ratio between the first and second measurement beam can be matched to the measurement conditions. In particular, an electronically controllable beam splitter is advantageous.

The interferometer according to the invention is suitable for a multiplicity of applications for one-beam and multi-channel vibrometers, such as e.g. in all heterodyne interferometers which are used with IR light at 1550 nm. The heterodyne coherent gain made possible by the design allows a shot-noise restricted detection of phase, but also, by amplitude modulation, for intensity. Therefore, the shifter can advantageously also be used for telecommunications, for lidar and for frequency comb generation.

In particular, the interferometer according to the invention is suitable for integration in a vibrometer:

Therefore, the invention comprises a vibrometer for interferometric measurement of an object, comprising a radiation source, an interferometer according to the invention or a preferable embodiment thereof, an optical superposition apparatus and at least one first detector. The radiation source and interferometer are embodied interacting in such a way that a light beam generated by the radiation source can be coupled into the output-beam beam input of the interferometer as an output beam.

The interferometer is embodied in a manner known per se to the extent that the first sub-beam can be imaged as a measurement beam on the object to be measured, and the superposition device and first detector are configured interacting in such a way that the measurement beam at least partly reflected by the object as a received beam and the reference beam are at least partly superposed on at least one detector area of the first detector in order to form interference. Therefore, in principle, the vibrometer according to the invention can correspond to the design of heterodyne interferometers known in advance. However, it is essential that the interferometer of the vibrometer is embodied as an interferometer according to the invention or as a preferred embodiment thereof.

By using the vibrometer according to the invention it is possible to determine, in a manner known per se, the movement of the object surface of the object to be measured in the direction of the optical axis of the measurement beam and, due to the heterodyne design, also the movement direction of the object surface.

Here, the vibrometer according to the invention can be embodied in such a way that the first sub-beam is the measurement beam.

The vibrometer preferably comprises an imaging optical unit for imaging the measurement beam on an associated measurement point on the surface of the object to be measured. In particular, the imaging optical unit is advantageously embodied for focusing the measurement beam on distant measurement objects, in particular on measurement objects which are more than 5 m, more than 10 m, in particular more than 100 m, away.

Here, preferably, the beam paths of measurement beam and received beam are formed by waveguide elements, in particular by optical fibers, between the imaging optical unit and interferometer. An advantage emerging from this is that a robust design is obtained and there is no need for spatial adjustment between the imaging optical unit and interferometer, but only between the imaging optical unit and a coupling-in point of the waveguide elements.

In the vibrometer according to the invention, it is advantageous if—as described above—the beam splitter is embodied for splitting at least two sub-beams with different intensities. Here, the measurement beam preferably has a higher intensity than the reference beam, in particular an intensity greater than or equal to 60%, preferably greater than or equal to 70%, more preferably greater than or equal to 80%, of the overall intensity of the measurement and reference beams.

This preferable embodiment is advantageous in that, typically, a relatively low intensity of the reference light is sufficient in order to obtain a sufficiently evaluable interference signal by the detector; in particular in order to reach the shot-noise limit. By contrast, an intensity which is as high as possible is wanted for the measurement beam, in particular to the extent that the object to be measured does not have mirroring and/or scattering surfaces.

It is therefore particularly advantageous to arrange the frequency shifter in the beam path of the reference beam since losses by conversion are also created when passing through a frequency shifter and the intensity is reduced, at least by a little.

The vibrometer according to the invention is preferably embodied as a multi-channel vibrometer. Here, provision is made for an additional measurement-beam beam splitter and an additional reference-beam beam splitter. The measurement-beam beam splitter is used to generate a multiplicity of measurement sub-beams, which are each imaged on the object to be measured, preferably at different spatial locations on the surface of the object to be measured, and the measurement sub-beams reflected and/or scattered from the object return into the beam path of the vibrometer as received sub-beams. The reference beam is accordingly split into a plurality of reference sub-beams by the reference-beam beam splitter. The vibrometer comprises a detector, at least for each measurement sub-beam, on which detector a reference sub-beam is superposed on the received sub-beam associated with the measurement sub-beam.

Therefore, in particular, in this advantageous embodiment, a spatially resolved measurement of the object is possible without a scanning method having to be applied. It likewise lies within the scope of the invention to carry out, in addition to the spatially resolved measurement, a scanning method for carrying out a plurality of spatially resolved measurements situated next to one another.

The detector of the vibrometer is preferably embodied as a "balanced detector". In the case of such an embodiment of a detector known per se, the detector has at least two sub-detectors, wherein a pair of measurement sub-beam and reference sub-beam is respectively superposed on each sub-detector. A common measurement signal is established in a manner known per se from the measurement signals from the two sub-detectors. Such balanced detectors are also referred to as differential detectors. It is advantageous to embody the detectors of all the sub-beams as balanced detectors in each case, particularly when the vibrometer is embodied as a multi-channel vibrometer.

In a further advantageous embodiment, the vibrometer according to the invention is embodied as a "diversity vibrometer" for evaluating the measurement signals according to the reception diversity principle, in particular in accordance with DE102012211549:

To this end, the beam splitter device is embodied for splitting the output beam into a measurement beam, a first reference sub-beam and at least one second reference sub-beam, and for splitting the received beam into a first received sub-beam and at least one second received sub-beam. The vibrometer comprises at least one second detector and is embodied in such a way that the first reference sub-beam is superposed on the first received sub-beam on a detection area of the first detector and the second reference sub-beam is superposed on the second received sub-beam on a detection area of the second detector, in each case forming optical interference. The vibrometer comprises an evaluation unit for evaluating the measurement signals from the first and second detector. The evaluation unit is embodied to evaluate the measurement signals from the two detectors according to the reception diversity principle. Here, it is advantageous to arrange the frequency shifter in the beam path of the measurement beam since the beam splitter device for splitting the reference beam into at least two reference sub-beams is already arranged in the beam path of the reference beam.

This advantageous embodiment as diversity vibrometer is based on the discovery by the applicant that object surfaces often influence the measurement beam in such a way that this results in a reduction in the measurement accuracy or even in a measurement dropout:

There is indebtedness to the broad usability of devices for interferometric measurements of an object, and, in particular, vibrometers that these devices find use not only for measuring objects with an optically mirroring surface, considered to be ideal, but are also used for measuring objects with uncooperative and, in particular, rough surfaces. The measurement beam is typically scattered diffusely from a rough surface and the intensity distribution of the received beam is therefore characterized by speckle. The speckle is based on the fact that the phase differences of the measurement beam, which, due to the roughness of the surface of the measurement object, is scattered at different object points which are distant from the device, leads to, independently in each direction, the resulting overall intensity yielding values deviating strongly from one another. Therefore, depending on the condition and alignment of the measured surface, this can result in a very high overall intensity; however, it is also possible that a very low intensity, or even an intensity of 0, emerges due to the phase differences. On the detector area of the detector, the interference of many scattered light contributions with different phase also leads to the overall intensity varying strongly.

Since the noise level of the position or speed to be measured on the object increases with decreasing signal strength, the quality of the measurement is therefore dependent on the speckle pattern. However, the speckle pattern changes and, in particular, varies depending on the current measurement point and alignment of the surface of the object.

Moreover, the aforementioned phase differences between the speckles are measured as an apparent movement: great reductions in the strength of the measurement signal (so-called "dropouts") can be formed due to the phase differences between the speckles since the light contributions can completely cancel one another out. Evaluating the measurement signals from the detector then yields an apparent jump in the position of the measured surface of the object, with the jump corresponding to approximately a quarter of the employed wavelength of the measurement beam. This correspondingly results in a high peak, for example in the evaluated speed, but this finds no correspondence in the real movement of the object.

If, moreover, a scanning measurement is carried out, in which the measurement beam is moved over a multiplicity of measurement points on the object and/or if the radiation source of the device and the surface of the object are not fixed ideally with respect to one another and/or if there is a deflection of the measurement beam as a result of atmospheric streaking effects, the received speckle pattern changes and the evaluable signal is falsified and will have, in particular from time to time, great signal dropouts.

The diversity vibrometer now uses the discovery that the aforementioned signal dropouts typically occur randomly (but nevertheless in a statistically describable manner) and, in the case of usual measurement conditions, only relate to a low percentage of the measurement time or the measurement points to be measured on the surface of the object. Now, if two or more independent raw signals have the aforementioned dropouts at different times and the raw signals are statistically independent, or at least approximately or preferably substantially statistically independent, then the probability for a dropout occurring simultaneously in two measurement channels equals the product of the probability thereof for each individual channel. This combined probability is much lower than for an individual channel. Therefore, this means that the probability of the aforementioned dropouts can be substantially reduced.

The principle of reception diversity is known in the technical field of radio transmission and is also referred to as antenna diversity therein. In the case of antenna diversity, a reception device for function signals has at least two antennas, the signals of which are in each case assessed in respect of the level or, better, the signal-to-noise ratio and one of the signals is used for evaluation on the basis of this assessment.

The diversity vibrometer now transfers the principle of reception diversity to the interferometric measurement of an object:

Therefore, by splitting the reference beam into a first and second reference sub-beam and by splitting the received beam into a first and second received sub-beam and by the corresponding superposition on the detection areas of the first and second detector, as described above, separate measurement signals from at least two detectors are available which, analogously to the two receivers in the antenna diversity, can be compared.

In the case of the diversity vibrometer, it is also essential that there is an evaluation on the basis of a quality criterion which enables an assessment of the quality of the measurement data of the first detector compared to the quality of the measurement data of the second detector, which evaluation, depending on the respectively established quality values, consists either of merely one measurement signal from one of the two detectors or of a combined measurement signal from both detectors, wherein the aforementioned combination may also contain a weighting depending on the applied quality.

Therefore, for the diversity vibrometer it is essential not only that there is an evaluation of data of the received beam by two detectors, but also that the received beam is evaluated in respect of different criteria by the two detectors. Therefore, a different item of information contained in the received beam is evaluated at least in part by the first detector and said information is compared to the information from the received beam evaluated (at least in part) by the second detector.

Studies by the applicant have yielded that the aforementioned information separation of the information contained in the received beam and assignment, firstly, to the first detector and, secondly, to the second detector is preferably carried out in view of at least one of the following criteria:

a) Separation in Respect of the Polarization

Here, different polarization components of the received beam are imaged on the first and second detector. This is advantageous, particularly in the case of objects to be measured which have a diffusely scattering surface. Non-metallic surfaces in particular are typically diffusely scattering faces. It is known that light which is diffusely scattered at non-metallic surfaces loses its previously defined polarization and therefore has random polarization, see Goodman, Joseph W., "*Speckle phenomena in optics*", page 47 ff., 2007, Roberts and Company Publishers.

Particularly in the case of such diffusely scattering surfaces, a separation in respect of the polarization therefore provides an option which can be implemented in a cost-effective manner for generating measurement signals at the first and second detector, with the signal dropouts of the measurement signals from the first measurement detector being statistically independent or at least substantially statistically independent from the signal dropouts of the measurement signals from the second measurement detector.

b) Spatial Separation

Here, the received beam is spatially split into at least one first and one second partial region of the beam cross section and the first partial region is forwarded to the first detector and the second partial region is forwarded to the second detector.

Therefore, there is a spatial split by virtue of partial regions of the beam cross section being forwarded either to detector 1 or to detector 2. In a preferred embodiment, the received beam is split into a right-hand half as first partial region and a left-hand half as second partial region, i.e. half of the beam cross section is assigned to the first partial region and half is assigned to the second partial region.

Therefore, there is a split of the spatial information of the received beam in this variant. Studies by the applicant have yielded that, in particular in the case of metallic surfaces, such a spatial separation of the received beam likewise brings about the desired statistical independence or at least substantial statistical independence of the signal dropouts of the signals from the first detector from the signal dropouts of the measurement signals from the second detector.

c) Mode Splitting

Here, the received beam is split in such a way that at least partly different beam modes, in particular beam transverse modes, are guided to detector 1 compared to detector 2. By way of example, merely a fundamental Gaussian mode of the received beam can be guided to detector 1 and merely further components of the received beam, in particular higher beam modes without fundamental Gaussian mode, can be guided to detector 2.

The split in respect of different beam modes of the received beam also causes the signal dropouts of the measurement signals from the first detector to be statistically independent or at least approximately statistically independent from the signal dropouts of the measurement signals from the second detector.

Here, the diversity vibrometer can be embodied analogously to an embodiment as per DE102012211549.8. DE102012211549.8 is explicitly included in the description by reference.

BRIEF DESCRIPTION OF THE SEVERAL VIEWS OF THE DRAWINGS

Further preferred features and embodiments are described in the following on the basis of figures. Here.

DETAILED DESCRIPTION OF THE PREFERRED EMBODIMENTS

Figure 1:
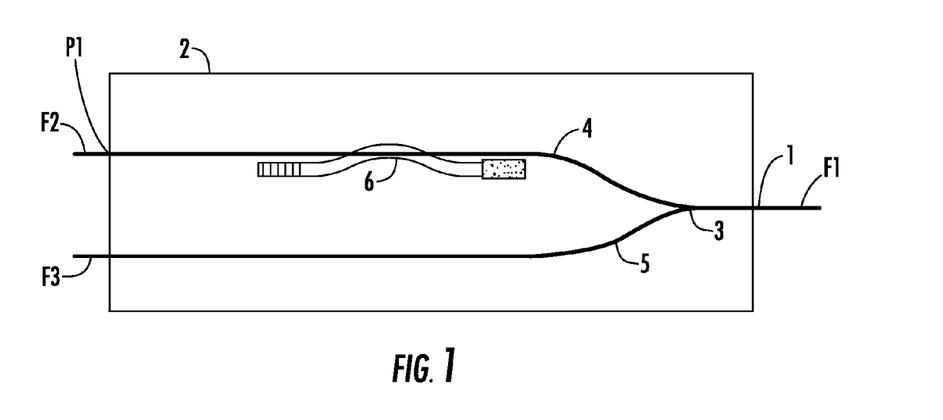
FIG. 1 shows an exemplary embodiment of the interferometer according to the invention.
Figure 2:
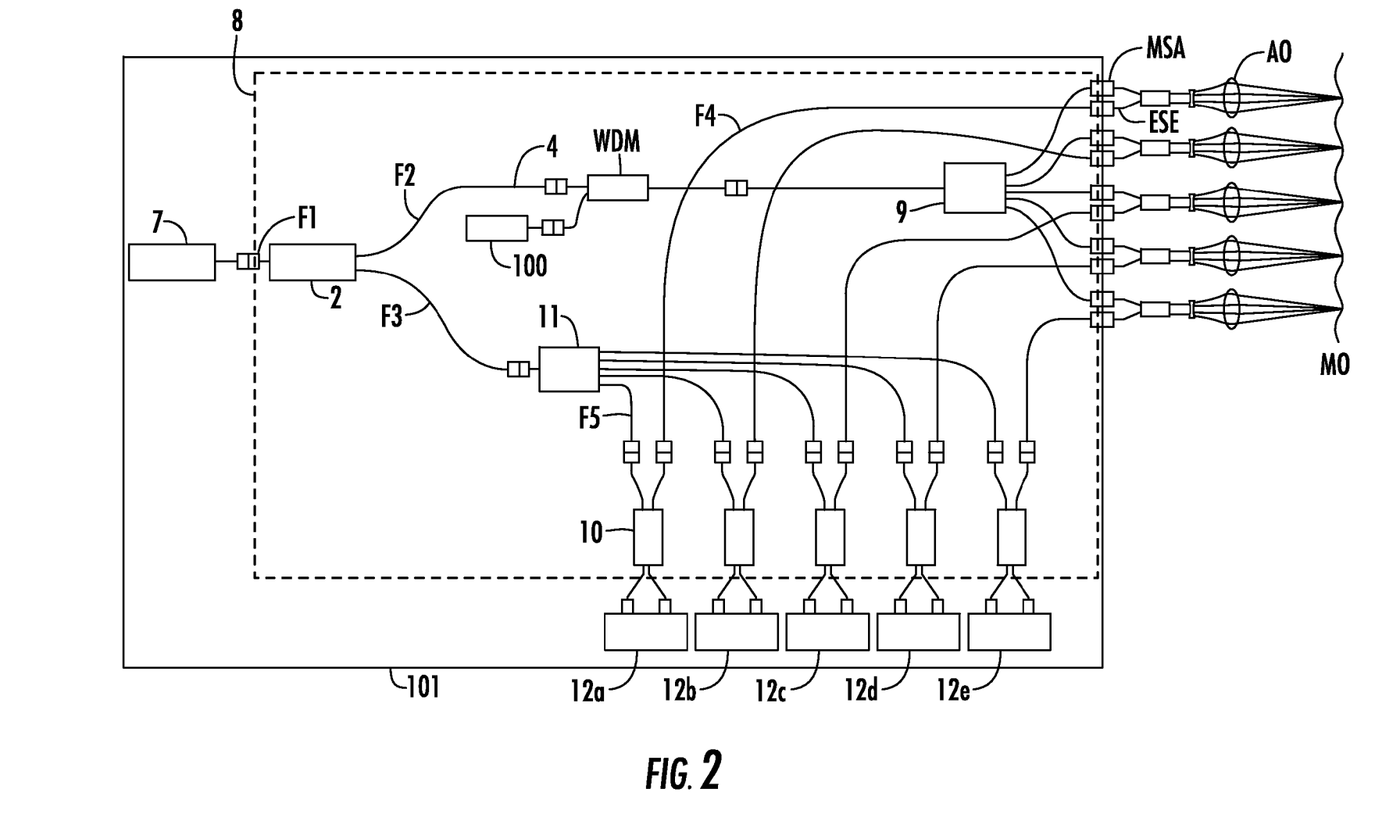
FIG. 2 shows an exemplary embodiment of a vibrometer according to the invention, which is embodied as a multi-channel vibrometer.
Figure 3:
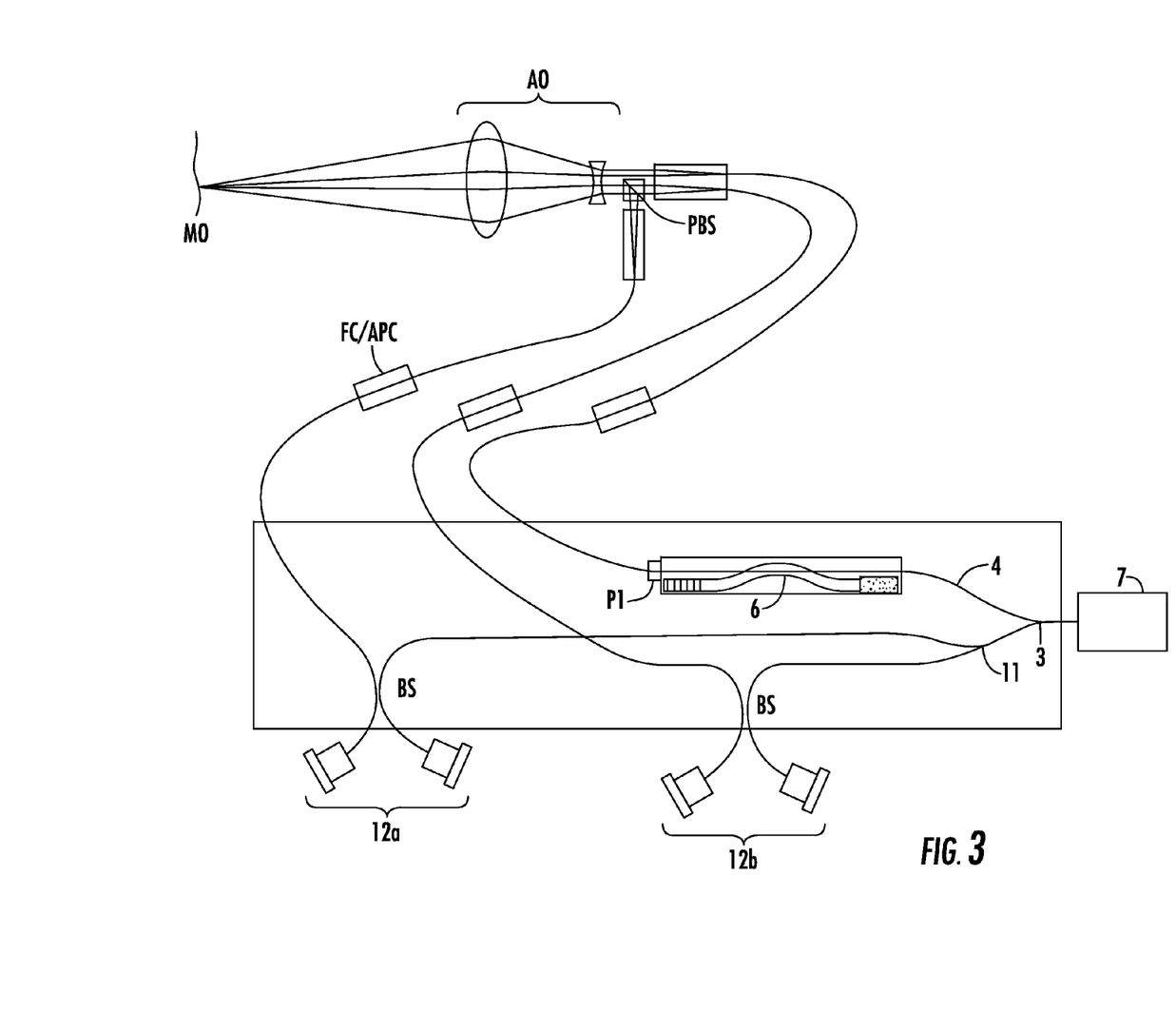
FIG. 3 shows an exemplary embodiment of a vibrometer according to the invention, which enables measurements according to the reception diversity principle.

FIGS. 1 to 3 show schematic illustrations. In the figures, the same reference signs denote the same or functionally equivalent elements.

FIG. 1 shows an exemplary embodiment of an interferometer according to the invention. The optical interferometer comprises an output-beam beam input 1, which is embodied as a fiber input: a first optical fiber F1 is provided to couple light from a radiation source into the first optical fiber F1. The optical interferometer has a planar waveguide structure 2. All the beam paths are formed as planar waveguides in this planar waveguide structure.

The planar waveguide structure is embodied as an LiNbO$_3$ waveguide structure.

The first optical fiber F1 couples the output beam at the output-beam beam input into the planar waveguide structure 2. The output beam is split into a first sub-beam 4 and a second sub-beam 5 by a beam splitter device 3.

The interferometer is embodied as a heterodyne interferometer, in which provision is made in the beam path of the first sub-beam 4 for an optical frequency shifter 6, which is embodied as an LiNbO$_3$ frequency shifter.

The first sub-beam is coupled into a second optical fiber F2 after passing through the frequency shifter 6 and the second sub-beam 5 is coupled into a third optical fiber F3.

As a result of embodying all the beam paths by optical fibers or planar waveguides and as a result of using the LiNbO$_3$ frequency shifter, an extremely robust and well-reproducible design is obtained, which moreover can have a compact embodiment.

Furthermore, the beam splitter device 3 is embodied as a non-polarizing beam splitter such that the reproducibility can be increased further.

Furthermore, the beam splitter device 3 is embodied in such a way that the output beam is split with an intensity ratio of approximately 20:80 such that the first sub-beam 4 has a lower intensity than the second sub-beam 5. The frequency shifter 6 can likewise be arranged in the beam path of the second sub-beam 5, with the lower intensity compared to the first sub-beam 4.

Furthermore, a polarization filter (reference sign P1) can be provided in the beam path of that sub-beam in which the frequency shifter 6 is arranged (therefore, in the present case in accordance with FIG. 1, in the beam path of the first sub-beam 4), at the transition between planar waveguide structure 2 and second optical fiber F2, which polarization filter is matched to the polarization of the light beam frequency shifted by the frequency shifter 6 such that possible further light-beam components of the first sub-beam 4, which do not have the polarization predetermined by the frequency shifter 6, are filtered out by the polarization filter P1, and hence the first sub-beam 4 is "cleaned".

The interferometer in accordance with FIG. 1 furthermore comprises optical elements (not depicted here) in order to superpose the second sub-beam on the first sub-beam in order to form interference.

FIG. 2 shows a first exemplary embodiment of a vibrometer according to the invention, which is embodied as a multi-channel vibrometer.

The vibrometer comprises a radiation source 7 for generating an output beam in the IR range, for example with a wavelength of 1550 nm. The output beam of the radiation source 7 is coupled directly into an optical fiber which is connected by a commercially available FC/APC connector to a first optical fiber F1 of an interferometer 8 (surrounded by a dashed line) of the vibrometer.

The interferometer 8 comprises a planar waveguide structure 2 which has an identical design to the planar waveguide structure 2 in accordance with FIG. 1 and comprises the components shown in FIG. 1 and not depicted in FIG. 2:

The output beam coupled into the planar waveguide structure 2 by the first optical fiber F1 is split into a first sub-beam 4 and a second sub-beam 5 by a beam splitter device 3 which is embodied as a non-polarizing beam splitter. A frequency shifter embodied as an LiNbO$_3$ frequency shifter is arranged in the beam path of the first sub-beam 4. The first sub-beam 4 is coupled into a second optical fiber F2 and the second sub-beam 5 is coupled into a third optical fiber F3.

The beam splitter device 3 is embodied in such a way that the first sub-beam has approximately 80% of the overall intensity of the first and second sub-beams.

The first sub-beam 4 serves as a measurement beam in the vibrometer in accordance with FIG. 2: the first sub-beam 4 is routed via a plurality of optical fibers to a measurement-beam beam splitter 9 and, by the latter, split into five measurement beams with approximately the same intensity. The five measurement beams are routed, likewise by optical fibers, to measurement-beam beam outputs (see, for example, reference sign MSA for a first measurement-beam beam output). There, further optical fibers are connected which are routed the respective measurement sub-beam to an imaging optical unit (for example the imaging optical unit AO in FIG. 2 for the first measurement sub-beam). The imaging optical unit is used to image the measurement sub-beam on an associated measurement point on the surface of the object MO to be measured. The at least partly reflected and/or scattered partial measurement beam is, as a received beam, once again coupled into an optical fiber by the imaging optical unit AO and to a received-beam beam input of the vibrometer (for example reference sign ESE in FIG. 2 for the received-beam beam input of the first received sub-beam). Arranged in each received sub-beam beam input is, in each case, an optical fiber (for example the fourth optical fiber F4 for the first received sub-beam). The first received sub-beam is routed to a first balanced beam splitter 10 by the fourth optical fiber F4.

The second sub-beam 5, which is coupled into the third optical fiber F3, serves as a reference beam:

The reference beam is routed to a reference-beam beam splitter 10 by optical fibers and split into five reference sub-beams with approximately the same intensity.

As is described in an exemplary manner for the first reference sub-beam, the latter is likewise routed by a fifth optical fiber F5 and further optical fibers to the balanced beam splitter 10. The balanced beam splitter 10 is used to superimpose the first reference sub-beam and the first received sub-beam and this superposition beam is split into two sub-beams in a manner known per se for balanced detectors, in the present case by a polarization beam splitter.

A first detector 12a correspondingly comprises two sub-detectors, on the detection area of which in each case one of the two balanced sub-beams is imaged such that a signal evaluation is possible for balanced detectors in a manner known per se.

The beam guidance is formed analogously for four further balanced detectors 12b to 12e.

Therefore, a non-scanning, spatially resolved measurement of five spatially different measurement points on the object MO is possible by the vibrometer in accordance with FIG. 2, with there being an evaluation in accordance with a balanced detector evaluation for each measurement point.

In many applications, it is important for the user to see the measurement beam. Therefore, provision is made in this exemplary embodiment for measurement light to be coupled via a WDM (wavelength division multiplexing) coupler with additional visible light, which is presently produced by an LED 100, into the imaging optical unit of the IR laser beam. However, since this coupler is very expensive, the FC/APC fiber connector for the transmission light can alternatively be connected to a connector for visible light.

Apart from the imaging optical units AO, the components of the vibrometer are arranged in a housing 101 so that the measurement sub-beams can be aligned merely by adjusting the imaging optical unit, with, however, no movement of the housing being necessary.

FIG. 3 shows a second exemplary embodiment of a vibrometer according to the invention, which enables an evaluation according to the diversity principle:

The basic design is equivalent to the design of the vibrometer in accordance with FIG. 2:

An output beam in the IR range, for example with a wavelength of 1550 nm, is generated by a radiation source 7, which output beam is split into a first sub-beam 4 and a second sub-beam 5 by a beam splitter device 3. The first sub-beam 4 serves as a measurement beam and passes through a frequency shifter 6, at the beam output of which a polarization filter P1 is arranged. The measurement beam is routed to an imaging optical unit AO by optical fibers in order to be imaged on a measurement point on the surface of a measurement object MO.

The measurement beam at least partly reflected and/or scattered by the surface of the measurement object reenters the beam path of the vibrometer as a received beam via the imaging optical unit AO.

What is essential now is that the received beam is split into two received sub-beams by a polarization beam splitter PBS.

In the vibrometer in accordance with FIG. 2, there are likewise a plurality of received sub-beams, with, however, in the vibrometer in accordance with FIG. 2, each received sub-beam being assigned to a different spatial location on the surface of the measurement object.

By contrast, in the vibrometer in accordance with FIG. 3, both received sub-beams are assigned to the same spatial location on the surface of the measurement object, but differ in terms of the polarization thereof due to the splitting by the polarization beam splitter PBS.

This generates two received sub-beams, which allow an evaluation of two statistically independent detection signals according to the diversity reception:

The vibrometer comprises a first detector 12A and a second detector 12B. Both detectors are embodied in a manner known per se as balanced detectors.

The vibrometer furthermore comprises a reference-beam beam splitter 11, by which the reference beam is split into two sub-beams with approximately the same intensity.

The first detector 12A is used to evaluate the interference signal between the first reference sub-beam and the first received sub-beam. Analogously, the second detector 12B is used to evaluate the interference signal between the second reference sub-beam and the second received sub-beam, in each case in the style of a balanced-detector evaluation.

What is essential now is that the interference signals from the detector 12A and from the detector 12B are assigned to the same measurement point on the surface of the measurement object MO, but are statistically independent of one another due to the differing polarization.

Therefore, it is possible to form an overall interference signal in the style of the diversity reception, for example by virtue of in each case the stronger one of the two signals being used for the evaluation or by virtue of there being a weighting of the two signals proportionally to the signal strength thereof in order to form an overall signal.

The invention claimed is:

1. A vibrometer for interferometric measurement of an object (MO), comprising a radiation source (7), an optical interferometer comprising an output-beam beam input (1) for coupling-in an output beam, and a beam splitter device (3) for splitting the output beam into at least one first sub-beam (4) and one second sub-beam (5), the interferometer being embodied as a heterodyne interferometer by including at least one optical frequency shifter (6) arranged in a beam path of the interferometer and the interferometer comprising one or more optical waveguide elements (2, F2, F3, F4), by which optical waveguides are formed, at least between the output-beam beam input (1), beam splitter device (3) and frequency shifter (6), and the frequency shifter (6) is arranged in the beam path of one of the first or second sub-beams, the vibrometer further comprising at least one first detector (12a), the radiation source and interferometer being embodied interacting in such a way that a light beam generated by the radiation source (7) is coupled into the output-beam beam input as an output beam, the interferometer being embodied to image the first sub-beam as a measurement beam on the object (MO) and the interferometer and first detector being configured interacting in such a way that the measurement beam at least partly reflected by the object (MO) as a received beam and the reference beam are at least partly superposed on at least one detector area of the first detector (12a), wherein the beam splitter device is embodied for splitting the output beam into a measurement beam, a first reference sub-beam and at least one second reference sub-beam, and for splitting the received beam into a first received sub-beam and at least one second received sub-beam, the vibrometer further comprises at least one second detector (12b) and is embodied in such a way that the first reference sub-beam is superposed on the first received beam on a detection area of the first detector (12a) and the second reference sub-beam is superposed on the second received sub-beam on a detection area of the second detector (12b), in each case forming optical interference, and the vibrometer evaluates the measurement signals from the first and second detector (12a, 12b) according to a reception diversity principle, and the frequency shifter (6) is arranged in the beam path of the measurement beam.

2. The vibrometer according to claim 1, wherein the optical beam paths are embodied without a beam path outside of a waveguide, at least between the output-beam beam input (1), the beam splitter device (3) and the frequency shifter (6).

3. The vibrometer according to claim 2, wherein the optical beam paths are formed by waveguides that do not have a beam path outside of the waveguides, at least between the output-beam beam input, the beam splitter device and the frequency shifter.

4. The vibrometer according to claim 1, wherein the beam splitter device (3) is non-polarizing.

5. The vibrometer according to claim 1, wherein the frequency shifter (3) is embodied as a birefringent waveguide.

6. The vibrometer according to claim 1, wherein the frequency shifter (3) is embodied as a birefringent waveguide which is influenced piezoelectrically.

7. The vibrometer according to claim 6, wherein the frequency shifter (3) is an acousto-optic lithium niobate frequency shifter.

8. The vibrometer according to claim 7, wherein the frequency shifter (3) is an $LiNbO_3$ frequency shifter.

9. The vibrometer according to claim 1, further comprising at least one polarization filter (P1), the frequency shifter (6) being arranged between the polarization filter (P1) and the beam splitter device (3) in the sub-beam in which the frequency shifter is arranged.

10. The vibrometer according to claim 1, wherein the beam splitter device (3) is embodied for splitting at least two sub-beams with different intensities.

11. The vibrometer according to claim 10, wherein the beam splitter device (3) is embodied for splitting the at least two sub-beams so that the first sub-beam has an intensity ≥60% of an overall intensity of the two sub-beams.

12. The vibrometer according to claim 1, wherein the one or more optical waveguide elements are embodied as at least one of planar waveguide tracks or optical fibers.

13. The vibrometer according to claim 12, wherein at least the beam paths between the beam input, the beam splitter device and the frequency shifter are embodied by planar waveguide tracks.

14. The vibrometer according to claim 1, wherein the first sub-beam (4) is the measurement beam.

15. The vibrometer according to claim 1, further comprising an imaging optical unit (AO) for imaging the measurement beam on an associated measurement point on a surface of the object (MO) to be measured.

16. The vibrometer according to claim 15, wherein the beam paths of measurement beam and received beam are formed by waveguide elements between the imaging optical unit (AO) and interferometer.

17. The vibrometer according to claim 1, further comprising at least one optical beam splitting means (PBS), which is arranged in at least one of the beam path of the received beam, the first received sub-beam, or the second received sub-beam, and embodied in such a way that at least one of different polarization components, different beam cross-section components, or different modes of the received beam can be evaluated with the first and second detector.

* * * * *